(12) United States Patent
Mudra et al.

(10) Patent No.: US 10,330,004 B2
(45) Date of Patent: Jun. 25, 2019

(54) SWITCH VALVE FOR CONTROLLING A HYDRAULIC FLUID FLOW AND CONNECTING ROD WITH THE SWITCH VALVE

(71) Applicant: ECO Holding 1 GmbH, Marktheidenfeld (DE)

(72) Inventors: Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 13 days.

(21) Appl. No.: 15/402,085

(22) Filed: Jan. 9, 2017

(65) Prior Publication Data
US 2017/0260899 A1    Sep. 14, 2017

(30) Foreign Application Priority Data

Mar. 14, 2016  (DE) .......................... 10 2016 104 619
Sep. 22, 2016  (DE) .......................... 10 2016 117 874

(51) Int. Cl.
*F02B 75/04* (2006.01)
*F15B 15/02* (2006.01)
(Continued)

(52) U.S. Cl.
CPC ............ *F02B 75/045* (2013.01); *F15B 15/02* (2013.01); *F15B 15/202* (2013.01);
(Continued)

(58) Field of Classification Search
CPC ...... F02B 75/045; F15B 15/02; F15B 15/202; F16C 7/06; F16K 11/0704; F16K 11/0716
(Continued)

(56) References Cited

U.S. PATENT DOCUMENTS 9,784,305 B2 * 10/2017 Wittek ...................... F16C 7/06
9,890,702 B2 *  2/2018 Schaffrath ............. F02B 75/045
(Continued)

FOREIGN PATENT DOCUMENTS

DE    102005055199 A1    5/2007
DE    102012020999 A1    1/2014
(Continued)

*Primary Examiner* — Marguerite J McMahon
*Assistant Examiner* — Teuta B Holbrook
(74) *Attorney, Agent, or Firm* — Von Rohrscheidt Patents

(57) ABSTRACT

A switch valve configured to control a hydraulic fluid flow, the switch valve including a capture element which is arranged in a valve housing and displaceable into a first switching position or a second switching position, wherein a first hydraulic connection is connected with a supply connection in the first switching position and a second hydraulic connection is connected with the supply connection in the second switching position, wherein at least two pass through bore holes are provided in the capture element and extend through the capture element, wherein a first pass through bore hole provides a fluid connection between the first hydraulic connection and the supply connection in the first switching position and a second pass through bore hole provides a fluid connection between the second hydraulic connection and the supply connection in the second switching position.

16 Claims, 3 Drawing Sheets

(51) Int. Cl.
  *F15B 15/20* (2006.01)
  *F16K 11/07* (2006.01)
  *F16C 7/06* (2006.01)
(52) U.S. Cl.
  CPC ...... *F16K 11/0704* (2013.01); *F16K 11/0716* (2013.01); *F16C 7/06* (2013.01)
(58) Field of Classification Search
  USPC .................. 137/102, 625.2; 123/48 R, 48 B
  See application file for complete search history.

(56) References Cited

U.S. PATENT DOCUMENTS

| | | | | |
|---|---|---|---|---|
| 2012/0152195 | A1* | 6/2012 | Schulze | F01L 1/34409 |
| | | | | 123/90.17 |
| 2015/0260094 | A1* | 9/2015 | Wittek | F02B 75/045 |
| | | | | 123/48 B |
| 2017/0248074 | A1* | 8/2017 | Ezaki | F02B 75/045 |
| 2017/0356335 | A1* | 12/2017 | Ezaki | F02B 75/045 |

FOREIGN PATENT DOCUMENTS

| | | |
|---|---|---|
| DE | 102012112461 A1 | 6/2014 |
| DE | 102014106715 A1 | 6/2014 |
| DE | 102013111617 A1 | 4/2015 |
| WO | WO2015082722 A2 | 6/2015 |

\* cited by examiner

SWITCH VALVE FOR CONTROLLING A HYDRAULIC FLUID FLOW AND CONNECTING ROD WITH THE SWITCH VALVE

RELATED APPLICATIONS

This application claims priority from and incorporates by reference German Patent Applications DE10 2016 104 619.1 filed on Mar. 14, 2016 and DE10 2016 117 874.8 filed on Sep. 22, 2016.

FIELD OF THE INVENTION

The invention relates to a switch valve in particular for a connecting rod for an internal combustion engine with variable compression with an eccentrical element adjustment device for adjusting an effective piston rod length. The invention furthermore relates to a piston rod with the switch valve.

BACKGROUND OF THE INVENTION

In internal combustion engines a high compression ratio has a positive effect upon efficiency of the internal combustion engine. Compression ratio is typically designated as a ratio of an entire cylinder volume before compression to a remaining cylinder volume after the compression. In internal combustion engines with external ignition, in particular gasoline engines which have a fixed compression ratio the compression ratio may only be selected high enough so that a so called knocking of the internal combustion engine is at full load operation is prevented. However, for much more prevalent partial load operation of the internal combustion engine thus with a lower cylinder filling the compression ratio can be selected with higher values without "knocking" occurring. The important partial load operations of the internal combustion engine can be improved when the compression ratio is variably adjustable. In order to adjust the compression ratio for example systems with a variable connecting rod length are known which actuate an eccentrical element adjustment device of a connecting rod using hydraulically or mechanically actuatable switch valves.

A generic switch valve can be derived from example from DE 10 2012 112 461 A1. A capture element of the switch valve described therein has a T-shaped groove through which drain conduits are connectable with a supply conduit. The known switch valve is arranged in a portion of the connecting rod above the crank bearing eye.

BRIEF SUMMARY OF THE INVENTION

In particular when using the connection rod in an inline engine this arrangement is disadvantageous due to the installation space required. Thus, it is an object of the invention to provide a switch valve and a connecting rod with the switch valve which switch valve is configured for an arrangement at a connecting rod for an inline engine.

The object is achieved according to an aspect of the invention by a switch valve configured to control a hydraulic fluid flow, the switch valve including a capture element which is arranged in a valve housing and displaceable into a first switching position or a second switching position, wherein a first hydraulic connection is connected with a supply connection in the first switching position and a second hydraulic connection is connected with the supply connection in the second switching position, wherein at least two pass through bore holes are provided in the capture element and extend through the capture element, wherein a first pass through bore hole of the at least two pass through bore holes provides a fluid connection between the first hydraulic connection and the supply connection in the first switching position and a second pass through bore hole of the at least two pass through bore holes provides a fluid connection between the second hydraulic connection and the supply connection in the second switching position.

Advantageous embodiments and advantages of the invention can be derived from the dependent claims, the description and the drawing figures.

A switch valve for controlling a hydraulic fluid flow is proposed that includes a capture element which is arranged in a valve housing and which is optionally movable into a first switching position or a second switching position. Thus, in the first switching position a first hydraulic connection is connected with a supply connection and in the second switching position a second hydraulic connection is connected with the supply connection.

According to the invention at least two pass through bore holes are provided in the capture element, wherein the pass through bore holes extend through the capture element, wherein the first switching position provides a fluid connection through one of the pass through bore holes between the first hydraulic connection and the supply connection and the second switching position provides a fluid connection through another one of the pass through bore holes between the second hydraulic connection and the supply connection.

It is an advantage of the switch valve according to the invention that the switch valve can be arranged below the connecting rod which is advantageous for an inline engine do to the limited installation space available. Thus, installation space conflicts with balancing weights of the crank shaft are prevented. According to the invention the capture element of the switch valve includes pass through bore holes which establish a fluid connection as a function of the switching position between hydraulic connections which are connected for example with drain conduits or feed conduits in the connecting rod body or the connecting rod cover and the supply connection of the switch valve. Thus, a T-shaped tangential groove that is described in the art can be omitted. Since two pass through bore holes are provided a first hydraulic fluid connection of the switch valve and a second hydraulic fluid connection of the switch valve can be respectively connected with the supply connection of the switch valve in a controlled manner as a function of a switching position of the capture element.

Thus, it is possible to provide the switch valve according to the invention as an adapter that is threadable to the connecting rod cover which is advantageous for reasons of installation space when the connecting rod is used in an inline engine. It is another advantage that the switch valve can be tested by itself before being mounted at a connecting rod. Since a sufficient amount of installation space for the switch valve is provided a space saving leaf spring can be omitted for implementing the engagement function and a robust compression coil spring can be used instead. Also this way a simple ball can be used as a capture element so that a complex and failure prone capture element can be omitted. The sealing paths in the capture element are much longer than for the arrangement with a T-shaped groove since the pass through bore holes consume less of the sealing surface. The concept advantageously provides two pass through bore holes. A capture element of this type can be advantageously used in different mechanical switch valves.

According to an advantageous embodiment at least two drain conduits and at least two connecting conduits can be configured in the valve housing wherein a first switching position connects the first drain conduit through one of the pass through bore holes with the first connecting conduit and a second switching position connects the second drain conduit through another one of the pass through bore holes with the second connecting conduit. This way a fluid connection can be established in a controlled manner as a function of the switching position between the first drain conduit and the second connecting conduit while the second drain conduit and the second connecting conduit are blocked and a fluid connection between the second drain conduit and the second connecting conduit is established while on the other hand side the first drain conduit and the second connecting conduit are blocked. Thus, very safe switching properties of the switch valve can be advantageously implemented.

According to an advantageous embodiment the pass through bore holes can be arranged in the capture element with an axial offset and can extend diametrically through the capture element. Thus, pass through bore holes can be provided in a simple manner through the diameter of the capture element wherein the pass through bore holes can respectively connect hydraulic conduits on both sides of the capture element with one another or block them. The fluid connection can be established separately as a function of the pass through bore hole or it can be blocked. A capture element of this type can also be produced in a cost effective manner.

According to an advantageous embodiment the valve housing can be provided as an adapter to be arranged at a connecting rod cover of a connecting rod. Thus, it is possible to provide the switch valve according to the invention as a threadable adapter at the connecting rod cover which is advantageous for reasons of installation space when the connecting rod is used in an inline engine. It is another advantage that the switch valve can be separately tested before being mounted at a connecting rod. Thus, the switch valve can be easily replaced with another switch valve when required wherein the other switch valve may not be mechanically actuatable but hydraulically actuatable.

According to an advantageous embodiment the valve housing can have sealing surfaces and/or seal elements so that the connecting conduits are sealable when the valve housing is properly mounted at a connecting rod cover. Through the adapter solution for the switch valve it is possible to provide simple seal elements like O-rings and smooth sealing surfaces which facilitate sealing the hydraulic connections of the switch valve when mounting the switch valve at the connecting rod cover. Since the valve housing is adaptable to the connecting rod cover using bolts a safe and permanent sealing of the hydraulic connections can be achieved this way.

According to an advantageous embodiment a respective throttling location, in particular a throttling bore hole can be provided between the connecting conduits and the capture element. A throttling location of this type can be advantageously provided in the hydraulic conduit upstream of the capture element in order to achieve little leakage of hydraulic fluid in the switch valve since a circumferential length of the openings of the hydraulic conduits at the capture element can be reduced. Thus, a smaller gap width causes less leakage of hydraulic fluid at a transition between the hydraulic conduit and the pass through bore hole.

According to an advantageous embodiment the drain conduits can be sealed on one side with a seal element wherein in particular the connecting bore holes can be sealed in outward direction by the respective seal element when the fluid connection is established through the respective pass through bore hole. When drain conduits and/or connecting conduits are produced for simplicity reasons with dead holes in the valve housing it can be advantageous to close an opening towards the outside of the valve housing with seal elements that are arranged on one side so that no outward leakage can occur. For example also set screws with Teflon coating can be provided as seal elements. This way production of the valve housing can be simplified and a compact design of the switch valve can be implemented.

According to an advantageous embodiment the capture element can be interlockable by an interlocking connection in the two switching positions, wherein in particular a spring loaded interlocking element can cooperate in the two switching positions with interlocking grooves configured in the capture element. For example a ball loaded by a compression spring can be provided as an interlocking element, wherein two recesses are provided in the capture element and spaced along a length of the capture element wherein the ball can interlock in the indentations. Thus, the capture element can be moved from one interlocking position into the other interlocking position when moving the capture element so that the capture element can be interlocked in both switching positions.

According to an advantageous embodiment the interlocking element can be configured as a ball that is loadable by a spring force of a spring, wherein the spring can be at least partially supported in a recess of the connecting rod cover when the valve housing is properly mounted at a connecting rod cover. A ball with a compression spring provides a simple interlocking element which has a very low propensity for failure so that a safe switching function can be provided long term. Since the spring can protrude into a recess in the connecting rod cover mounting the switch valve is simple. The ball and the compression spring thus only have to be installed when the switch valve is mounted at the connecting rod cover. Also this arrangement saves installation space for the compression spring in the valve housing since the spring is arranged partially recessed in the connecting rod cover.

According to an advantageous embodiment the valve housing can include an axially defined groove in which a stop element of the capture element is arranged limiting a shift travel. A stop element of this type is a proven measure to limit the switch travel of the capture element. Thus, the switching function with the two switching positions can be reliably provided.

According to an advantageous embodiment the hydraulic connections can be at least partially formed by recesses which are provided for receiving attachment screws for attaching the valve housing at the a connecting rod according to the invention. This way installation space for the hydraulic conduits can be advantageously configured in the valve housing since bore holes for receiving the bolts can serve a dual function. Thus, the valve housing can be produced in a cost effective manner.

According to another aspect of the invention a piston rod for an internal combustion engine with variable compression with an eccentrical element adjustment device for adjusting an effective connecting rod length is proposed. Thus, according to the invention an adjustment path of the eccentrical element adjustment device is adjustable by a switch valve. The eccentrical element adjustment device advantageously includes an eccentrical element that interacts with an eccentrical lever, wherein the eccentrical element includes two pistons which are respectively movably supported in a hydraulic chamber and in which eccentrical element rods of the eccentrical element adjustment device are supported wherein the eccentrical element rods are also supported at the eccentrical element lever. Changing the adjustment travel changes the effective connecting rod length. This facilitates controlling the compression of the internal combustion engine. A connecting rod of this type can include an eccentrical element adjustment device which is provided in particular for switching the control pistons in the connecting rod in order to achieve a variable compression of the internal combustion engine.

A rotation of the adjustable eccentrical element adjustment device is introduced by an impact of mass and load forces of the internal combustion engine which impact the eccentrical element adjustment device during an operating stroke of the internal combustion engine. During the operating stroke the effective directions of forces impacting the eccentrical element adjustment device change continuously. The rotating movement or the adjustment movement is supported by pistons that are loaded with hydraulic fluid, in particular motor oil, and which are integrated in the piston. The pistons prevent a resetting of the eccentrical element adjustment device due to changing effective force directions of the forces impacting the eccentrical element adjustment device.

According to an advantageous embodiment the eccentrical element adjustment device can include at least one and advantageously two cylinders with a respective piston which is movably supported in a cylinder bore hole and connected with a support rod. Thus, an inlet can be provided for feeding hydraulic fluid into the cylinders and an outlet for draining the hydraulic fluid from the cylinders. The pistons are moveably supported in the hydraulic chambers and loaded by the hydraulic fluid through hydraulic fluid conduits. Thus the pistons prevent a back flow of the hydraulic fluid out of the hydraulic chambers back into the hydraulic fluid conduits. The hydraulic fluid conduits connected with the hydraulic chambers cooperate at least partially with the switch valve according to the invention.

According to an advantageous embodiment the outlet of the first cylinder can be connected with a hydraulic fluid loop through the capture element in the first switching position and in the second switching position the outlet of the second cylinder can be connected with the hydraulic fluid loop. Thus, the switch valve according to the invention can provide a reliable adjustment of the effective piston rod length through the eccentrical element adjustment device in that the outlets of the two cylinders are respectively connected through the capture element with the hydraulic fluid loop, for example the motor oil loop in both switching positions.

According to an advantageous embodiment at least on a portion of the circumference of a crank bearing eye in the portion of the connecting rod cover a first groove can be provided for connecting the switch valve with the hydraulic fluid loop and/or in the portion of the connecting rod body a second groove can be provided for supplying the feed into the cylinders with hydraulic fluid from the hydraulic fluid cycle. This way the hydraulic fluid conduits in the connecting rod functioning as inlets into the cylinders can be reliably supplied with the hydraulic fluid through the second groove in the portion of the connecting rod body while the hydraulic fluid conduits of the switch valve can discharge hydraulic fluid into the hydraulic fluid loop through the first groove in the portion of the connecting rod cover.

BRIEF DESCRIPTION OF THE DRAWINGS

Further advantages can be derived from the subsequent drawing description. The drawings illustrate an embodiment of the invention. The drawings, the description and the claims include several features in combination. A person skilled in the art will advantageously view the features individually and combine them into additional useful combinations, wherein:

DETAILED DESCRIPTION OF THE INVENTION

Figure 1:
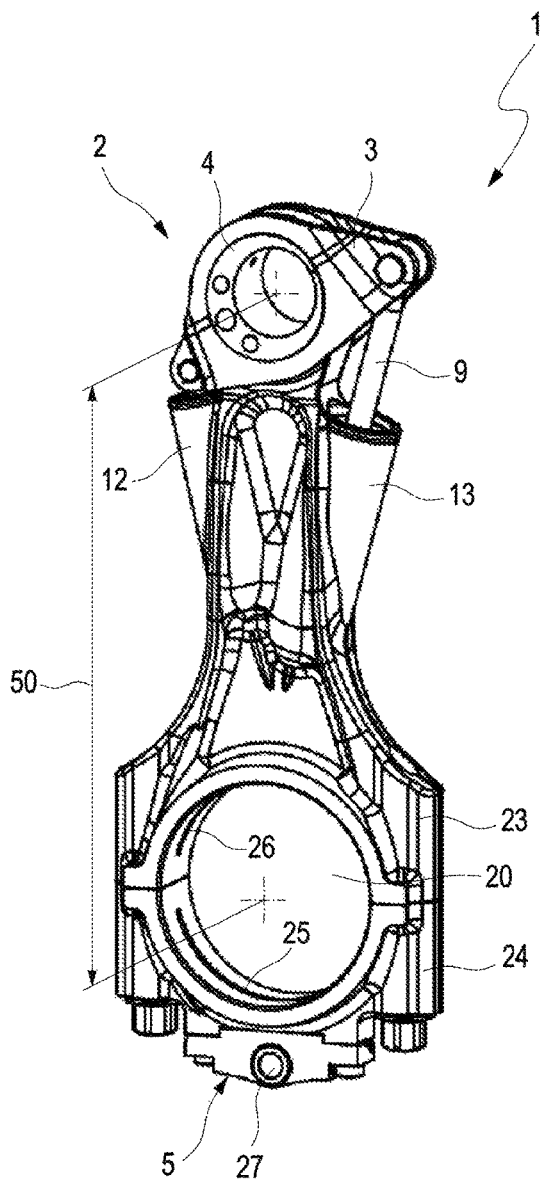
FIG. 1 illustrates a connecting rod according to the invention for an internal combustion engine with variable compression with a mounted switch valve in a top view.

In the drawing figures identical or like components are designated with identical reference numerals. The drawing figures only illustrate exemplary embodiments and do not limit the scope and spirit of the invention.

Figure 2:
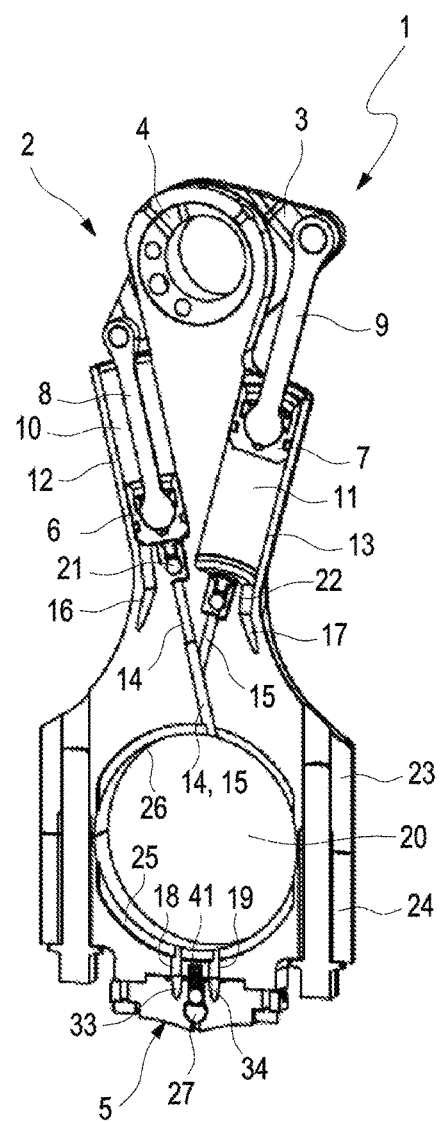
FIG. 2 illustrates the connecting rod of FIG. 1 in a longitudinal sectional view.

FIGS. 3-7 illustrate various views and sectional views of a switch valve 5 according to the invention which is provided in particular for a connecting rod 1 illustrated in FIGS. 1 and 2 for a variable compression internal combustion engine. FIGS. 1 and 2 illustrate the connecting rod 1 with a switch valve 5 mounted as an adapter at a bottom side of the connecting rod cover 24.

The connecting rod 1 includes an eccentrical element adjustment device 2 for adjusting an effective connecting rod length 50 with an eccentrical element 4 which cooperates with a one component or multi component eccentrical element lever 3. Thus, an adjustment path of the eccentrical element adjustment device 2 is adjustable by a switch valve 5. The effective connecting rod length 50 is thus defined as a distance of a center axis of the crank bearing eye 20 from a center axis of a bore hole of the eccentrical element 4 configured as a connecting rod bearing eyelet.

A rotation of the eccentrical element adjustment device 2 is initiated by an impact of mass and load forces of the internal combustion engine which impact the eccentrical element adjustment device during an operating stroke of the internal combustion engine. During an operating stroke effective directions of the forces impacting the eccentrical element adjustment device 2 change continuously. The rotating movement or adjustment movement is supported by one or plural pistons 6, 7 loaded with hydraulic fluid, in particular motor oil and integrated in the connecting rod 1 or the pistons 6, 7 prevent a reset of the eccentrical element adjustment device 2 based on changing effective directions of forces impacting the eccentrical element adjustment device 2. The piston 6, 7 are operatively connected with the eccentrical element lever 3 by support rods 8, 9.

As evident from FIG. 2 which illustrates a longitudinal sectional view of the connecting rod 1 the pistons 6, 7 are respectively movably supported in a cylinder bore hole 10, 11 of a cylinder 12, 13. The cylinders 12, 13 can be provided as a separate component or they can be integrally provided in one piece together with a connecting rod body of the connecting rod 1. By the same token it is also conceivable to provide the connecting rod 1 with only one cylinder and to use a double acting piston.

The pistons 6, 7 are movably arranged in hydraulic chambers formed by the cylinder bore holes 10, 11 and loaded from the crank bearing eye 20 through inlets 14, 15 with hydraulic fluid through check valves 21, 22. These check valves prevent a back flow of the hydraulic fluid from the hydraulic chambers into the hydraulic fluid conduits into a bearing shell of the crank bearing eye 20 and facilitate a suction of hydraulic fluid into the hydraulic chambers. As can be derived from FIG. 2 the two inlets 14, 15 can originate as a single conduit from the crank bearing eye 20 and can subsequently divide respectively in a direction towards the hydraulic chambers.

The hydraulic chambers are further connected through only partially visible drains 16, 17 with the switch valve 5. These drains 16, 17 extend through a connecting rod body 23 and a connecting rod cover 24 attached thereto in a direction towards a bottom side of the connecting rod 1 where the switch valve 5 is attached as an adapter. Thus, a first conduit and a second conduit 18, 19 connect the switch valve 5 with the oil loop, e.g. the bearing shell of the internal combustion engine. As evident at least one groove 25 is provided for this purpose in the connecting rod cover 24 in the portion of the crank bearing eye 20. On the other hand side a groove 26 in the connecting rod body 23 facilitates the suction in a direction towards the hydraulic chambers in the portion of the crank bearing eye 20.

Figure 3:
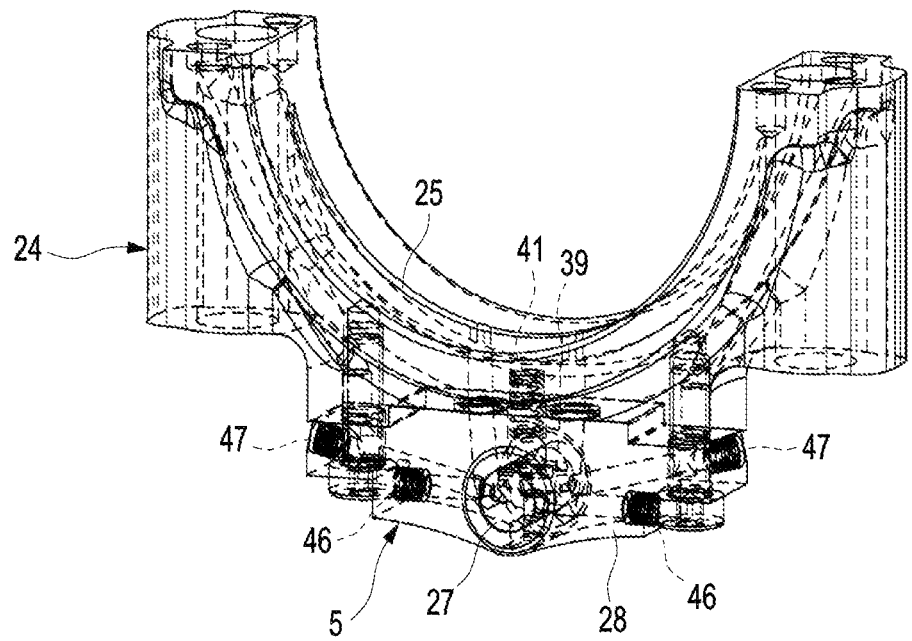
FIG. 3 illustrates the connecting rod cover with the switch valve of FIG. 1 in a semi-transparent view.
Figure 4:
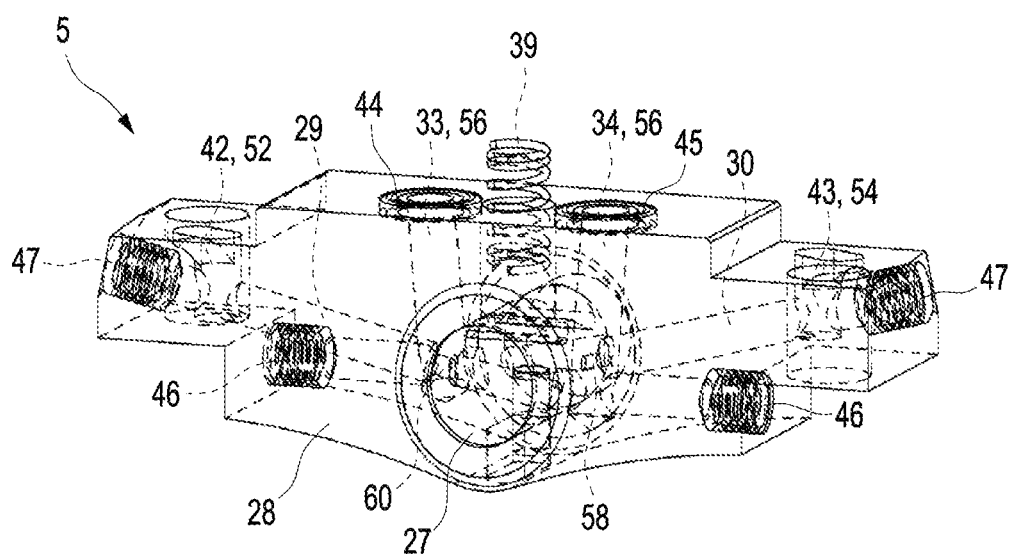
FIG. 4 illustrates a switch valve according to an embodiment of the invention in a semi-transparent view.

In FIG. 3 the connecting rod cover 24 is illustrated in a semi-transparent view, whereas FIG. 4 illustrates the switch valve 5 in a semi-transparent blown up view.

The switch valve 5 according to the invention includes a capture element 27 which is arranged in a valve housing 28 and which is optionally movable into a first switching position S1 or into a second switching position S2, wherein the capture element 27 connects the outlet 16 of the first cylinder 12 with a hydraulic fluid loop in the first switching position and the outlet 17 of the second cylinder 13 with the hydraulic fluid loop in the second switching position.

The capture element 27 includes two pass through bore holes 31, 32 which facilitate the respective connection between the hydraulic fluid loop and the outlet in the two switching positions. Thus, a respective drain conduit 29, 30 is connectable through one of the pass through bore holes 31, 32 with a connecting conduit 33, 34 formed in the valve housing 28 as a function of the switching position, wherein the connecting conduits are connected with the conduits 18, 19 of the connecting rod cover 24. The sealing between the valve housing 28 and the connecting rod cover 24 is performed by seal elements 44, 45 arranged about the connecting conduits 33, 34. The pass through bore holes 31, 32 are arranged axially offset in the capture element 27 and extend diametrically through the capture element 27.

Between the connecting conduits 33, 34 and the capture element 27 a respective throttling location 58, 60, in particular a throttling bore hole is provided.

The valve housing 28 is provided as an adapter for arrangement at the connecting rod cover 24 of the connecting rod 1 and can be bolted to the connecting rod cover 24 for example by bolts arranged in the recesses 42, 43.

The capture element 27 is optionally movable into a first switching position S1 or a second switching position S2, wherein a first hydraulic connection 52 of the switch valve 5 is connected with a supply connection 56 of the switch valve 5 in the first switching position S1 and a second hydraulic connection 54 of the switch valve 5 is connected with the supply connection 56 of the switch valve 5 in the second switching position S2. For this purpose two pass through bore holes 31, 32 are provided in the capture element 27 wherein the pass through bore holes extend through the capture element 27, wherein one of the pass through bore holes 31, 32 provides a fluid connection between the first hydraulic connection 52 and the supply connection 56 in the first switching position S1 and another one of the pass through bore holes 31, 32 provides a fluid connection between the second hydraulic connection 54 and the supply connection 56 in the second switching position S2.

The outlets 16, 17 of the cylinders 12, 13 run through the hydraulic connections 52, 54 into the outlet conduits 29, 30 of the switch valve 5 which are visible for example in FIG. 4 which depicts the switch valve 5 with a semi-transparent valve housing 28. Thus, through the capture element 27 the outlet 16 of the first cylinder 12 is connectable with the hydraulic fluid loop in the first switching position S1 and the outlet of the second cylinder 13 is connectable with the hydraulic fluid loop in the second switching position S2.

As evident in particular from FIG. 4 the hydraulic connections 52, 54 with the outlet conduits 29, 30 are at least partially formed by recesses 42, 43 which extend through the valve housing 28 in order to attach the valve housing 28 at the connecting rod cover 24 and which are provided at a connecting rod 1 to receive mounting bolts for attaching the valve housing 28 at a connecting rod 1.

Figure 5:
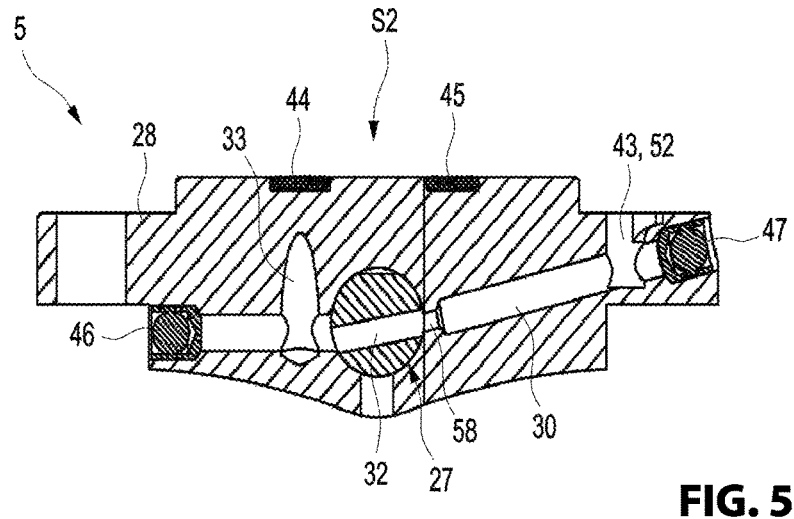
FIG. 5 illustrates the switch valve of FIG. 4 in a longitudinal sectional view.

As evident in particular from FIG. 5 which illustrates a longitudinal sectional view of the switch valve 5 the conduits in the valve housing 28 like e.g. drain conduits 29, 30 are partially established by lateral bore holes which are closed again on one side by seal elements 46, 47 so that in particular the connecting conduits 33, 34 are sealed in an outward direction by a respective seal element 46, 47 when the fluid connection is established through the respective pass through bore hole 31, 32. Thus, fabrication of the bore holes can be simplified and a compact design of the switch valve 5 is achieved.

The seal elements 44, 45 which are used for sealing the connecting conduits 33, 34 when the switch valve is mounted at the connecting rod cover 24 and which can be configured as O-rings are visible in FIG. 5 in a lateral cut out.

The capture element 27 is illustrated in FIG. 5 in the second switching position S2.

Figure 6:
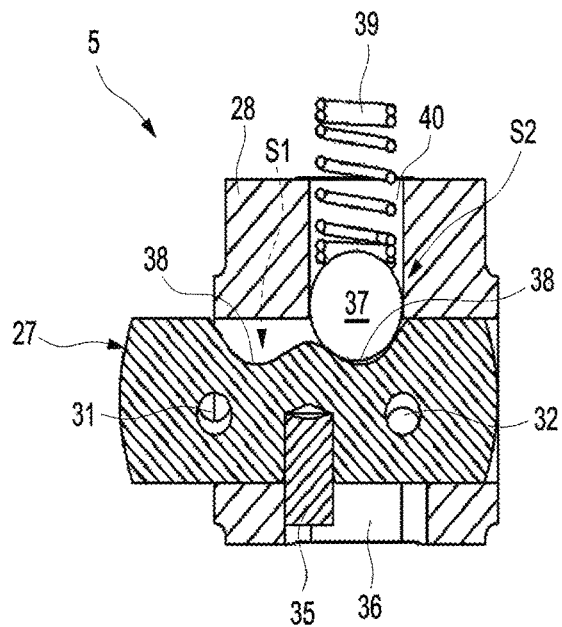
FIG. 6 illustrates the switch valve of FIG. 4 in a cross sectional view.

A stop element 35 arranged in a groove 36 is used for defining the switch travel of the capture element 27 as evident from the cross section of the switch valve 5 illustrated in FIG. 6.

The capture element 27 is interlockable in the two switching positions by a spring loaded interlocking element 37 that is configured as a ball, wherein the interlocking element 37 interacts with interlocking grooves 38 provided in the capture element 27. A compression spring 39 applying a spring force is partially supported in a recess 40 of the valve housing 28 and additionally supported in a recess 41 of the connecting rod cover 24 after mounting the valve housing 28.

The capture element 27 is also illustrated in the second switching position S2 in FIG. 6. The second recess of the interlocking groove 38 1 defines the first switching position S1.

Figure 7:
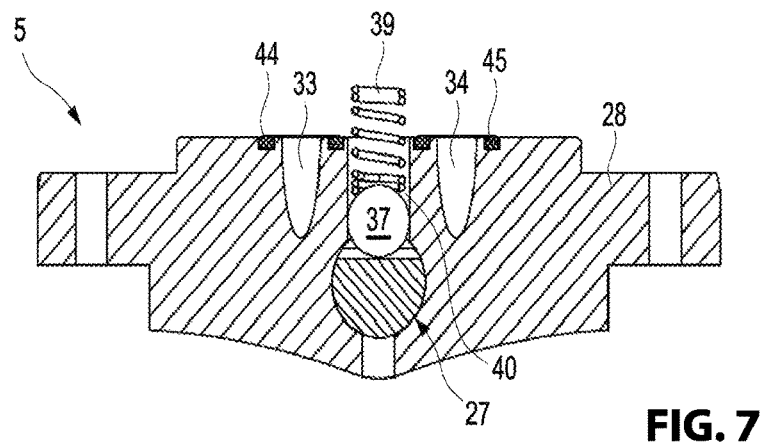
FIG. 7 illustrates the switch valve of FIG. 4 in another longitudinal sectional view.

FIG. 7 illustrates another longitudinal sectional view of the switch valve 5 in which in particular the seal elements 44, 45 for sealing the connecting conduits 33, 34 during assembly at the connecting rod cover 24 are visible. The seal elements 44, 45 are for example O-rings which are visible in FIG. 7 in a sectional view. Furthermore the capture element 27 is visible in a cross sectional view with the interlocking element 37 configured as a ball which is pressed into the interlocking groove 38 by the spring 39.

The switch valve 5 according to the invention can be arranged at a bottom side of the connection rod 1 due to the arrangement of the conduits within the valve housing 28 and due to the arrangement of the pass through bore holes 31, 32. The pass through bore holes 31, 32 furthermore facilitate improved sealing since a large sealing surface is provided at the capture element 27.

What is claimed is:

1. A switch valve configured to control a hydraulic fluid flow, the switch valve comprising:
    a capture element which is arranged in a valve housing and displaceable into a first switching position or a second switching position,
    wherein a first hydraulic connection is connected with a supply connection fed from a bearing in the first switching position and a second hydraulic connection is connected with the supply connection fed from the bearing in the second switching position,
    wherein at least two pass through bore holes are provided in the capture element and extend through the capture element,
    wherein each of the at least two pass through boreholes connects two openings in the capture element, and
    wherein a first pass through bore hole of the at least two pass through bore holes provides a fluid connection between the first hydraulic connection and the supply connection in the first switching position and a second pass through bore hole of the at least two pass through bore holes provides a fluid connection between the second hydraulic connection and the supply connection in the second switching position.

2. The switch valve according to claim 1,
    wherein the valve housing includes at least two outlet conduits and at least two connecting conduits, and
    wherein a first outlet conduit of the at least two outlet conduits is connectable in the first switching position through the first pass through bore hole with a first connecting conduit of the at least two connecting conduits and a second outlet conduit of the at least two outlet conduits is connectable in the second switching position through the second pass through bore hole with a second connecting conduit of the at least two connecting conduits.

3. The switch valve according to claim 2, wherein the valve housing includes sealing surfaces or seal elements so that the at least two connecting conduits are sealable when the valve housing is mounted at a connecting rod cover.

4. The switch valve according to claim 2, wherein a respective throttling location is provided between the at least two connecting conduits and the capture element.

5. The switch valve according to claim 2,
    wherein the at least two outlet conduits are sealed on one side by a respective seal element, and
    wherein the at least two connecting conduits are sealed in an outward direction by the respective seal element when a fluid connection is established through the at least two pass through bore holes.

6. The switch valve according to claim 1, wherein the at least two pass through bore holes are arranged axially offset in the capture element and diametrically extend through the capture element.

7. The switch valve according to claim 1, wherein the valve housing is provided as an adapter configured to be arranged at a connecting rod cover of a connecting rod.

8. The switch valve according to claim 1,
    wherein the capture element is interlockable by an interlocking connection in the first switching position or the second switching position, and
    wherein a spring loaded interlocking element cooperates in the first switching position and in the second switching position with interlocking grooves configured in the capture element.

9. The switch valve according to claim 8,
    wherein the interlocking element is configured as a ball which is loadable by a spring force from a spring, and
    wherein the spring is at least partially supported in a recess of the connecting rod cover when the valve housing is mounted at the connecting rod cover.

10. The switch valve according to claim 1, wherein the valve housing includes an axially defined groove in which a stop element of the capture element is arranged wherein the stop element limits a switching travel of the capture element.

11. The switch valve according to claim 1, wherein the first hydraulic connection and the second hydraulic connection are at least partially formed by recesses which are configured to receive mounting bolts to mount the valve housing at a connecting rod.

12. A connecting rod for an internal combustion engine with variable compression, the connecting rod comprising:
    an eccentrical element adjustment device for adjusting an effective piston rod length,
    wherein an adjustment travel of the eccentrical element adjustment device is adjustable by the switch valve according to preceding claim 1.

13. The connecting rod according to claim 12,
    wherein the eccentrical element adjustment device includes at least one cylinder including a piston that is movably supported in a cylinder bore hole and connected with a support rod, and
    wherein a respective inlet for feeding hydraulic fluid into the at least one cylinder and a respective outlet for draining the hydraulic fluid from the at least one cylinder is provided.

14. The connecting rod according to claim 12,
    wherein the respective outlet of a first cylinder of the at least two cylinders is connected with a hydraulic fluid loop through the capture element in the first switching position, and
    the respective outlet of a second cylinder of the at least two cylinders is connected with the hydraulic fluid loop through the capture element in the second switching position.

15. The connecting rod according to claim 12,
    wherein a first groove hydraulically connecting the switch valve with the hydraulic fluid loop is provided at least in a portion of a circumference of a crank bearing eye in a portion of the connecting rod cover, or
    a second groove supplying the respective inlet into the at least one cylinder with hydraulic fluid from the hydraulic fluid loop is provided in a portion of the connecting rod body.

16. The connecting rod according to claim 12,
    wherein a first groove hydraulically connecting the switch valve with the hydraulic fluid loop is provided at least in a portion of a circumference of a crank bearing eye in a portion of the connecting rod cover, and a second groove supplying the respective inlet into the at least one cylinder with hydraulic fluid from the hydraulic fluid loop is provided in a portion of the connecting rod body.

* * * * *